April 20, 1937.  C. K. MOSEY ET AL  2,078,206
TESTING INSTRUMENT
Filed Nov. 15, 1934
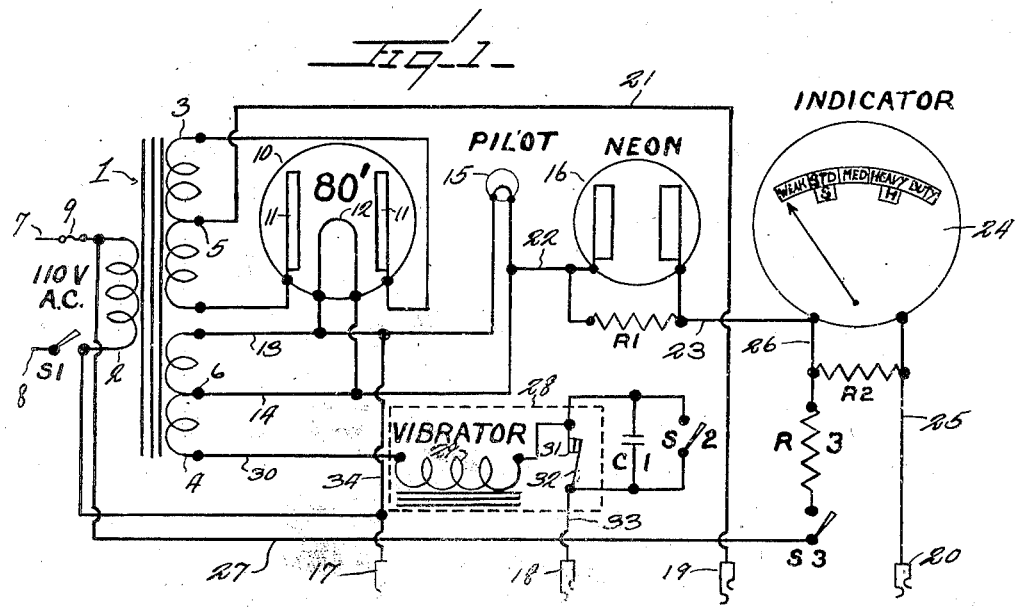
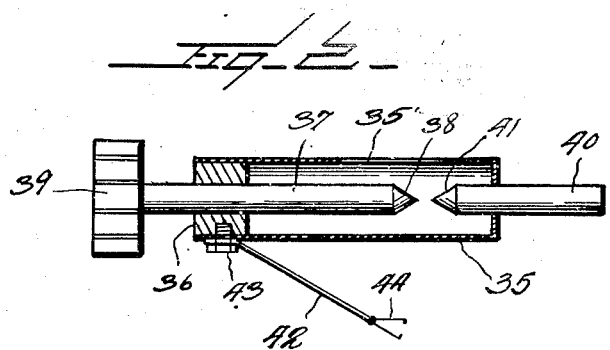
Inventors
C. K. Mosey
& G. W. Mosey
Watson E. Coleman
ATTORNEY Patented Apr. 20, 1937

2,078,206

UNITED STATES PATENT OFFICE 2,078,206

TESTING INSTRUMENT

Clarence K. Mosey and George W. Mosey, Seattle, Wash.

Application November 15, 1934, Serial No. 753,209

2 Claims. (Cl. 175—183)

This invention relates to improvements in electrical test devices which are designed for testing pieces of electrical apparatus, particularly such as are used in the electrical system of a motor vehicle.

The primary object of the present invention is to provide an all electric tester adapted for operation on any of the usual commercial lighting or power circuits and eliminates the use of batteries of any type.

Another object of the invention is to provide a tester by which such devices as condensers may be tested for leakage and capacity; ignition coils may be tested for spark and output, and generator cutouts, brush holders, starter fields and armatures may all be tested to determine whether they are in the proper condition for use.

A further object of the invention is to provide a tester which when used in testing condensers will not injure the same even though they may be of a cheap or inferior grade.

A still further object is to provide an instrument which is not complicated in design, does not require any particular electrical knowledge to operate and which will give an accurate analysis of the condition of a condenser, spark coil or other device under test.

Other objects and advantages of the invention will become apparent as the description of the same proceeds and reference is had to the accompanying drawing forming a part of the specification, it being understood that the invention is not to be limited to any strict conformity with the showing of the drawing but may be changed or modified so long as such changes or modifications mark no material departure from the salient features of the invention as expressed in the appended claims.

In the drawing:

Figure 1 is a circuit diagram of the tester embodying the prevent invention.

Figure 2 is a detail view of an element used in association with the circuit.

Referring to the drawing wherein like numerals of reference designate corresponding parts throughout the views, the numeral 1 indicates generally a step-down power transformer having a primary coil 2 and the first and second secondary coils 3 and 4, respectively, the latter coils being provided with center taps 5 and 6. In the use of the tester, the primary coil is connected with the proper current supplying circuit, from which the current flows in and out by way of the wires 7 and 8, one of which wires is provided with a fuse 9 while the other has a switch $S^1$ connected therein.

A full wave rectifying tube of the 280 or 380 type is indicated by the numeral 10, each of the two anodes 11 of which is connected with one end of the first secondary coil while the filament cathode 12 is connected in circuit between the center tap 6 of the second secondary and the low voltage side of the same, by means of the wires 13 and 14. A pilot light 15 is also connected in the same circuit with the filament 12 and serves to give notice to the user of the tester when the rectifier tube is operating and whether the neon tube 16 which forms a part of the tester, is receiving current.

A series of four jacks forms a part of the tester device, which are indicated by the numerals 17, 18, 19 and 20, and the jack 19 is electrically connected by the wire 21 with the center tap 5 of the first secondary coil and, receiving negative current, forms the negative terminal for the tester. The neon tube 16 has one plate or electrode electrically coupled by the wire 22 with the wire 14 which forms one side of the circuit in which the rectifier tube filament is connected while the other plate or terminal of the neon tube is electrically connected by the wire 23 with one side of an indicator 24 of the milliampere type which, instead of having its dial face marked to indicate milliamperes, is marked with the words "Weak", "Standard", "Medium", "Heavy Duty", for use in the testing of ignition coils. The other side of the indicator 24 is connected by the wire 25 with the terminal jack 20 and connecting across between the wire 25 and a wire 26 which leads from the side of the indicator with which the wire 23 is connected, is a shunt resistance $R^2$ of approximately 2200 ohms. The wire 26 connects with the resistance $R^3$ of approximately 1000 ohms, which separates the indicator from a switch $S^3$ which has the side opposite from the resistance $R^3$ connected by the wire 27 with one side of the primary coil of the transformer. The terminals of the neon tube 16 are also connected by a shunt resistance $R^1$ of approximately 1 megohm. The numeral 28 designates generally a vibrator, having a magnet 29, one end of the coil of which is connected by the wire 30 with the high voltage end of the second secondary coil 4. The other end of the coil 29 is connected with the terminal 31 adjacent which is the armature 32 which is electrically connected by the wire 33 with the jack 18. Connected across the armature 32 and its contact point 31 is a fixed condenser $C^1$ of approximately .2 microfarad capacity and parallel with this condenser is a switch $S^2$ by which the condenser may be cut out of circuit with the armature. The jack 17 is connected by a wire 34 with one side of the circuit in which the filament 12 is located or, as illustrated, with the side 13 thereof.

Figure 2 shows a unit which is used in connection with the tester in the testing of spark coils. This unit comprises a cylinder 35 of a suitable insulation material such as fiber or the like, in one end of which is secured a metallic body 36 which has a central opening through which extends a metal bar 37 which is relatively tightly held in the opening but capable of being longitudinally shifted, the inner end of the bar being pointed as indicated at 38, while the outer end has a head 39 by which longitudinal adjustment of the bar is facilitated.

In the opposite end of the casing 35 is a metallic bar or electrode 40 which is secured in place and has its inner end pointed, as at 41, for use as a terminal in association with the point 38 of the shiftable bar or electrode 37.

A wire 42 is secured at one end in any suitable manner by a fastening 43 so as to be electrically connected with the body 36 and the other end of this wire is connected with a clip 44 by means of which the wire may be connected with the terminal of an instrument under test.

The present tester may be used for testing a large number of electrical instruments but an example will be given of the manner in which the tester is used for testing only four instruments.

In making a test for the capicity of a condenser, after the primary coil has been connected to a suitable source of current such, for example, as a 110-volt alternating current line, by the use of suitable coupling leads, the condenser is connected between the jacks 17 and 20, the switch $S^3$ having been closed. The current will then flow from the 110-volt line through the switch $S^3$, the resistor $R^3$ to the meter or indicator 24 and the 2200 ohm resistor $R^2$ to jack 20 and back to the condensers. The meter or indicator 24 will indicate the amount of AC milliamperes passing through the condenser. In addition to the meter or indicator designating the character or condition of the condenser, the neon tube will flash once if the condenser is in good condition. If this tube flickers or glows, the condenser is indicated as shorted. If the meter 24 indicates a standard condenser, the needle will point to S or to H if the condenser is of the heavy duty type.

In testing a condenser for leakage, the condenser is connected by suitable leads between the jacks 19 and 20 and the switch $S^1$ is closed as is also necessary in the test previously described. This will cause direct current to flow from the rectifier to the terminal or jack 19 through the condenser to the terminal 20, the meter and the neon tube. If the condenser is open, no flash will be had in the neon tube. If the tube glows, the condenser is shorted or if it flickers, the condenser is no good or broken down. If a flash is had in the neon tube, the condenser is indicated as in good condition.

In making a test for the spark of the coil, the device indicated in Figure 2 is employed wherein the jacks 17 and 18 are connected with the primary winding of the coil and the secondary winding is connected with the jack number 20. The connection 42 upon the spark indicator is connected to the primary post on the coil and a coupling is made between the post 40 of the spark gap device and the coil secondary. With the switch $S^2$ off, when the switch $S^1$ is closed, current will flow from the circuit of the transformer in which the filament 12 is connected through the wire 34 to the jack 17 and by way of the primary coil through the jack 18 and the vibrator coil 29. As the armature 32 of the vibrator operates, the condenser $C^1$ taking the place of a condenser upon a car, the making and breaking of the alternating current flowing through the coil 29 will create an induced current in the secondary of the coil under test and cause a spark to show between the points 38 and 41 of the spark gap. The condition of the coil can be determined by the approximate lengths of the sparks formed between the points 38 and 41, the points being adjusted by sliding the terminal 37 longitudinally.

In testing for spark coil output, that is, whether the current delivered by the spark coil is weak or strong, the same connections are employed as in the spark test with the addition that the switch $S^2$ is closed so as to short out the vibrator condenser $C^1$ and the armature 32. The primary of the spark coil is then connected in the second secondary circuit of the transformer and the induced current will flow from the secondary of the spark coil through the meter 24 by way of the jack 20, to the neon tube and into the transformer filament coil, grounding at jack 17. The meter 24 will give the milliampere output of the coil under test. During this test, the neon tube will glow but this plays no part in determining the condition of the coil for sparking but merely completes the circuit. However, the neon tube acts as a ballast to keep the milliamperage at a minimum and thus eliminating the possibility of damaging the condenser during the test.

The casing 35 is provided with an oblong window 35' which may be covered by a suitable transparent material or left open as desired, through which the quality of the spark produced may be observed.

The foregoing are four examples of the uses to which the present tester can be put. It will be obvious to those versed in the art that many other tests may be made with the same instrument.

What is claimed is:—

1. In an electrical testing instrument, a stepdown transformer having a primary and a first and second secondary coil, each of said secondary coils having a center tap, a rectifier tube having a pair of plates and a filament, each of said plates being connected with one end of the first secondary coil, a pair of jacks, a meter of the milliampere type having a pair of terminals, an electrical connection between the center tap of the first secondary coil and one of said jacks, electrical connection between one side of said meter and the other one of said jacks, a current conductor connected between the center tap and one end of the second secondary coil and forming a closed circuit, said rectifier tube filament being connected across said circuit, a neon tube electrically connected between the other side of said meter and one side of said closed circuit, a second pair of jacks, an electrical connection between one side of the primary transformer coil and the said other side of the meter, a resistance in said last electrical connection, an electrical connection leading from one of the second pair of jacks to the other side of the transformer primary coil and to one side of said closed circuit, a vibrator connected between the other one of the second mentioned pair of jacks and the other end of the second secondary coil, the vibrator including a pair of relatively movable contact points, and a condenser connected across said points.

2. In an electric testing circuit, a transformer unit having a high voltage primary and a secondary coil, a milliampere type meter, a pair of terminals, one of which is electrically coupled with one side of said meter, an electric coupling between the other one of the pair of terminals and one side of the secondary coil, a neon tube electrically connected between the said one side of the secondary and the other side of said meter, an electrical connection between one side of the primary coil and the said other side of the meter, said last connection including a resistance, an electrical connection between the other side of the primary coil and the second terminal, a vibrator unit including a magnet, a vibrating armature and a terminal co-acting with the armature, an electrical connection between the other end of the secondary and one side of the magnet, the other side of the magnet being connected with the armature terminal, a third terminal electrically connected with the armature, and a condenser connected across the armature and its terminal.

CLARENCE K. MOSEY.
GEORGE W. MOSEY.